(12) United States Patent
Gillette et al.

(10) Patent No.: US 11,536,886 B2
(45) Date of Patent: Dec. 27, 2022

(54) ROLL OF FILM INCLUDING MULTILAYER BIREFRINGENT REFLECTIVE POLARIZER HAVING LOW PASS AXIS VARIATION

(71) Applicant: 3M INNOVATIVE PROPERTIES COMPANY, St. Paul, MN (US)

(72) Inventors: Kristy A. Gillette, Spring Valley, WI (US); Matthew B. Johnson, Woodbury, MN (US); Carl A. Stover, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 422 days.

(21) Appl. No.: 16/624,644

(22) PCT Filed: Jun. 26, 2018

(86) PCT No.: PCT/IB2018/054707
§ 371 (c)(1),
(2) Date: Dec. 19, 2019

(87) PCT Pub. No.: WO2019/003109
PCT Pub. Date: Jan. 3, 2019

(65) Prior Publication Data
US 2020/0166684 A1    May 28, 2020

Related U.S. Application Data

(60) Provisional application No. 62/524,992, filed on Jun. 26, 2017.

(51) Int. Cl.
*G02B 5/30* (2006.01)
*B32B 27/06* (2006.01)
(Continued)

(52) U.S. Cl.
CPC ............ *G02B 5/3083* (2013.01); *B32B 27/06* (2013.01); *G02B 5/305* (2013.01);
(Continued)

(58) Field of Classification Search
CPC ............ G02B 5/3083; G02F 1/133538; G02F 1/133536; G02F 1/133545; G02F 1/13363; B32B 7/02; B32B 27/06; B32B 27/36
See application file for complete search history.

(56) References Cited

U.S. PATENT DOCUMENTS

| 3,610,729 A | 10/1971 | Rogers |
| 4,446,305 A | 5/1984 | Rogers |

(Continued)

FOREIGN PATENT DOCUMENTS

| CN | 110799332 B | * 12/2021 | ............ B32B 27/06 |
| JP | 2007-002027 | 1/2007 | |

(Continued)

OTHER PUBLICATIONS

International Search Report for PCT International Application No. PCT/IB2018/054707, dated Oct. 25, 2018, 8 pages.

*Primary Examiner* — Sophie Hon
(74) *Attorney, Agent, or Firm* — Clifton F. Richardson; Daniel J. Iden

(57) ABSTRACT

Rolls of film are described. In particular, rolls of film including multilayer birefringent polarizers having low pass axis variation are described. The multilayer birefringent polarizers have low pass axis variation across a full cross-web width of the roll of film.

14 Claims, 4 Drawing Sheets

(51) Int. Cl.
  *G02F 1/1335* (2006.01)
  *G02F 1/13363* (2006.01)
(52) U.S. Cl.
  CPC .... *G02F 1/13363* (2013.01); *G02F 1/133528* (2013.01); *G02F 1/133536* (2013.01); *G02F 1/133538* (2021.01); *G02F 1/133545* (2021.01)

(56) References Cited

U.S. PATENT DOCUMENTS

| | | |
|---|---|---|
| 4,540,623 A | 9/1985 | Im |
| 5,448,404 A | 9/1995 | Schrenk |
| 5,882,774 A | 3/1999 | Jonza |
| 6,096,375 A | 8/2000 | Ouderkirk |
| 6,111,697 A | 8/2000 | Merrill |
| 6,113,811 A | 9/2000 | Kausch |
| 6,697,195 B2 | 2/2004 | Weber |
| 6,939,499 B2 | 9/2005 | Merrill |
| 6,949,212 B2 | 9/2005 | Merrill |
| 7,104,776 B2 | 9/2006 | Merrill |
| 7,826,009 B2 | 11/2010 | Weber |
| 2007/0047080 A1 | 3/2007 | Stover |
| 2007/0231548 A1 | 10/2007 | Merrill |
| 2007/0298271 A1 | 12/2007 | Liu |
| 2008/0151371 A1* | 6/2008 | Weber ................ G02B 5/3041 359/489.05 |
| 2011/0102891 A1 | 5/2011 | Derks |
| 2012/0121824 A1* | 5/2012 | Toyama ................ C09J 133/14 428/354 |
| 2015/0022888 A1 | 1/2015 | Weber |
| 2015/0036082 A1 | 2/2015 | Cho |
| 2015/0124194 A1 | 5/2015 | Oya |
| 2015/0378077 A1 | 12/2015 | Haag |
| 2016/0306086 A1 | 10/2016 | Haag |

FOREIGN PATENT DOCUMENTS

| | | |
|---|---|---|
| JP | 2011-037140 | 2/2011 |
| JP | 2011-215216 | 10/2011 |
| JP | 2016-060075 | 4/2016 |
| KR | 20170009614 A * | 1/2017 ....... G02F 1/133528 |
| WO | WO 99-36812 | 7/1999 |
| WO | WO 2011-162259 | 12/2011 |
| WO | WO 2015-085114 | 6/2015 |
| WO | WO 2017-034892 | 3/2017 |
| WO | WO 2018-163009 | 9/2018 |
| WO | WO 2019-003107 | 1/2019 |

* cited by examiner

ROLL OF FILM INCLUDING MULTILAYER BIREFRINGENT REFLECTIVE POLARIZER HAVING LOW PASS AXIS VARIATION

BACKGROUND

Multilayer birefringent reflective polarizers may be delivered in roll form. Reflective polarizers preferentially reflect light of one polarization while substantially transmitting light of an orthogonal polarization. Reflective polarizers have a pass axis. The pass axis is parallel to the linear polarization of light that is substantially transmitted.

SUMMARY

In one aspect, the present disclosure relates to a roll of film. The roll of film includes a multilayer birefringent reflective polarizer having a pass axis that varies along a crossweb direction. The multilayer birefringent reflective polarizer includes alternating layers of a birefringent layer and an isotropic layer. The birefringent layer of the multilayer birefringent reflective polarizer includes polyethylene naphthalate or a copolymer including polyethylene naphthalate and polyethylene terephthalate monomers. The pass axis of the multilayer birefringent reflective polarizer varies by no more than about 1 degree across a full crossweb width of the roll of film. The full crossweb width is greater than 27 inches, and the multilayer birefringent reflective polarizer has a contrast ratio of at least 200:1 after the roll of film is exposed to 90% relative humidity at 65° C. for 500 hours.

In another aspect, the present disclosure relates to a method of processing a polymeric web. The method includes providing a polymeric multilayer web including alternating layers of a layer capable of developing birefringence including polyethylene naphthalate or a copolymer including polyethylene naphthalate and polyethylene terephthalate monmers, and an isotropic layer; heating the polymeric multilayer web beyond the glass transition temperature of the isotropic layer; tentering the polymeric multilayer web to form a multilayer reflective polarizer such that the layer capable of developing birefringence develops birefringence; and, after tentering, controlling the instantaneous change in machine direction tension of the multilayer reflective polarizer such that the pass axis of the multilayer reflective polarizer varies by no more than about 1.5 degrees across a full crossweb width of the multilayer reflective polarizer. The multilayer reflective polarizer is environmentally stable such that the multilayer reflective polarizer has a contrast ratio of at least 200:1 after the multilayer reflective polarizer is exposed to 90% relative humidity at 65° C. for 500 hours.

In yet another aspect, the present disclosure relates to a method of processing a polymeric web. The method includes providing a polymeric multilayer web including alternating layers of a layer capable of developing birefringence including polyethylene naphthalate or a copolymer including polyethylene naphthalate and polyethylene terephthalate monomers, and an isotropic layer; heating the polymeric multilayer web beyond the glass transition temperature of the isotropic layer; and forming a multilayer reflective polarizer by tentering the polymeric multilayer web with a total transverse direction draw ratio of about 6.5 or greater such that the layer capable of developing birefringence develops birefringence. The multilayer reflective polarizer is environmentally stable such that the multilayer reflective polarizer has a contrast ratio of at least 200:1 after the multilayer reflective polarizer is exposed to 90% relative humidity at 65° C. for 500 hours.

DETAILED DESCRIPTION

Figure 1:
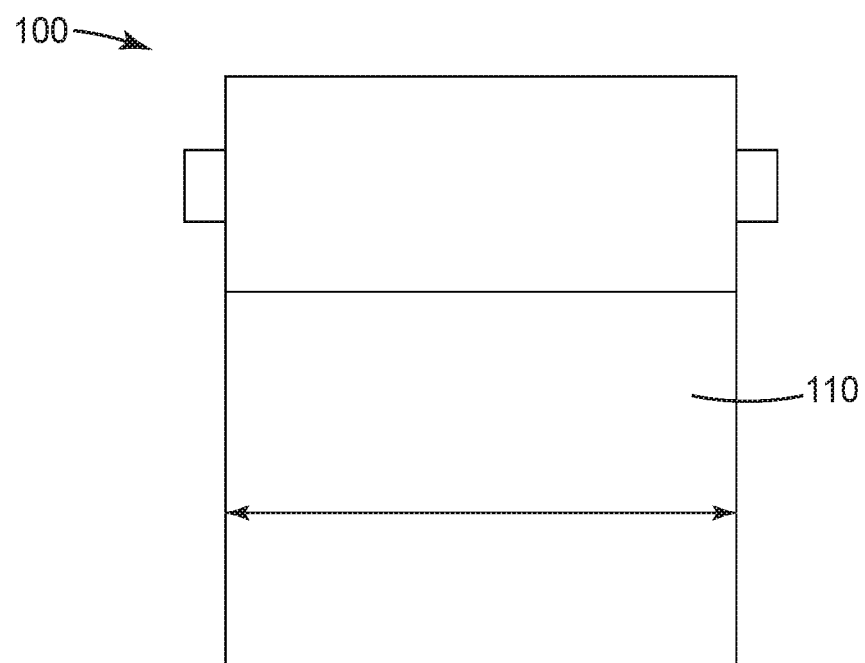
FIG. 1 is a top plan view of a roll of film.

Multilayer birefringent reflective polarizers are formed by stretching a polymeric web including at least one layer capable of developing birefringence and one other layer. In some embodiments, the other layer is an isotropic layer; i.e., the layer is not designed to become birefringent under the same stretching conditions as the layer capable of developing birefringence. In some embodiments, the isotropic layer is isotropic because it does not develop birefringence due to its molecular structure. In some embodiments, the isotropic layer is isotropic because it does not develop birefringence at the same temperature as the layer capable of developing birefringence.

Reflective polarizers are useful in displays; particularly in liquid crystal displays or other transmissive displays that utilize a backlight for uniform illumination. Reflective polarizers are typically laminated to, attached to, or disposed next to conventional absorbing polarizers, in order to provide a sufficient contrast ratio (the ratio of the maximum to minimum transmission while the backlight is on) to be useful or acceptable as a display. However, the lamination/attachment process or the handling and converting of separate films adds manufacturing cost and complexity. Further, due to unevenness in stretch during the orientation process, conventional reflective polarizers have a large variation in pass axis direction along a crossweb direction. For some conventional reflective polarizers, the pass axis can vary along the full crossweb width by 3 degrees or more. The variation in pass axis direction makes it difficult to align the axes of the reflective polarizer and absorbing polarizer, which results in a worse contrast ratio or lower transmission for the display. Alternatively, a large quantity of material may need to be discarded in order to find a film component both properly sized and having suitable levels of pass axis variation.

Modification of certain process conditions can enable film rolls of reflective polarizers as described herein. Stretching conditions for the polymeric multilayer web in particular may have a significant effect on pass axis variation. For example, surprisingly high transverse direction draw ratios enabled the development of highly birefringent interfaces while still maintaining good uniformity across the crossweb width. In some embodiments, the total transverse direction draw ratio (i.e., the ratio of the final transverse width to the initially casted, pre-stretching width is very high. In some embodiments, the total transverse direction draw ratio of at least 6. In some embodiments, the total transverse direction draw ratio is at least 7. In some embodiments, the total transverse direction draw ratio is at least 7.5.

In some embodiments, after tentering the polymeric multilayer web to form a multilayer reflective polarizer, the instantaneous change in machine direction tension in the multilayer reflective polarizer is controlled such that the pass axis varies minimally across the full crossweb width of the multilayer reflective polarizer. Effective control of instantaneous machine direction tension across the multilayer reflective polarizer may utilize different process modifications dependent on the variety of tenter used in the orientation process.

For example, for a conventional linear tenter, typical processing conditions allow for "toe-in," or a crossweb relaxation immediately post-stretching and before trimming the edges of the film, in order to improve shrinkage and other physical characteristics of the film. Films described herein, however, take advantage of a limited or minimal toe-in in order to surprisingly preserve a much more uniform pass axis across the full crossweb width. In some embodiments, the crossweb width is reduced by no more than 1%, not including edge trimming. In some embodiments, the crossweb width is reduced by no more than 0.5%, not including edge trimming.

Figure 3:
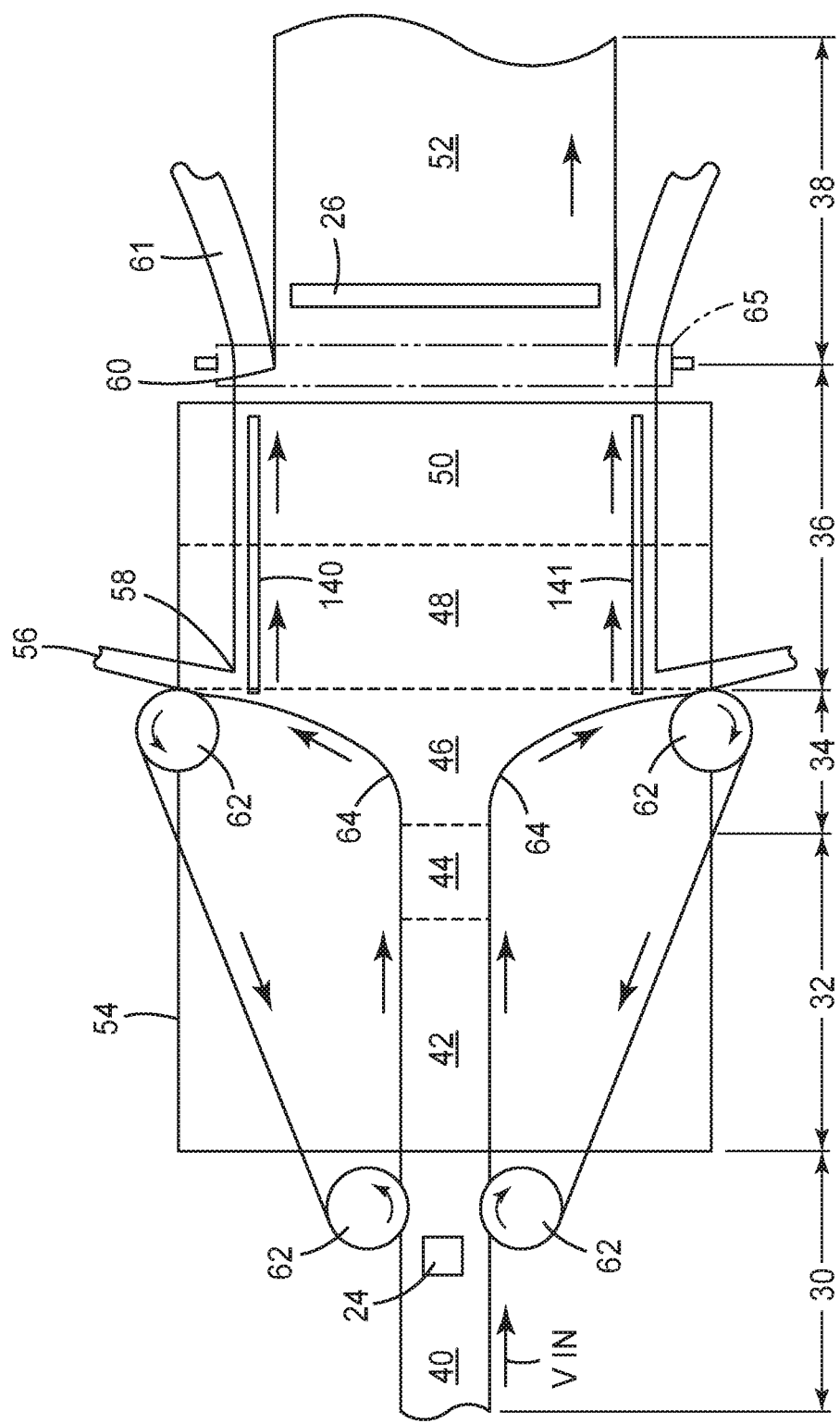
FIG. 3 is a top plan schematic of a parabolic tenter.

In a parabolic tenter, such as the one described in U.S. Pat. No. 6,949,212 (Merrill et al.) and shown in FIG. 3, controlling instantaneous machine direction tension across the multilayer reflective polarizer means extending the gap (in a machine direction) more than is conventionally done between the end of the parabolic tenter rails and the beginning of the rails of the isolated takeaway mechanism. In FIG. 3, this includes moving the tracks 140 and 141 farther in the machine direction from rollers 62. In some embodiments, the gap is at least 3 inches. In some embodiments, the gap is at least 4 inches. In some embodiments, the gap is at least 5.

FIG. 1 is a top plan view of a roll of film. Roll 100 includes multilayer birefringent reflective polarizer 110.

Multilayer birefringent reflective polarizer 110 includes alternating microlayers of at least two different materials. Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber.

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods. In some embodiments, at least one of the materials used in the alternating polymer layers is either polyethylene naphthalate or a copolymer that includes polyethylene terephthalate and polyethylene naphthalate. In some embodiments, at least one of the materials used in the layers capable of developing birefringence is polyethylene naphthalate or a copolymer of polyethylene naphthalate, polyethylene terephthalate, and any other monomer at a mol % less than 10%, with mol % based on the diacid monomer being 100%.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Layers may be arranged generally as thinnest to thickest. In some embodiments, the arrangement of the alternating optical layers may vary substantially linearly as a function of layer count. These layer profiles may be referred to as linear layer profiles. In some embodiments, the thickness of the layers may be arranged monotonically. Generally, linear layer profiles are based on the overall shape of the layer arrangement, and minor or insignificant deviations from a linear layer profile would still be considered by a person having ordinary skill in the art as being a linear layer profile. In some embodiments, this may be referred to as a substantially linear layer profile. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some embodiments, multilayer birefringent reflective polarizer 110 may include at least two packets. In some embodiments, the two packets of the multilayer birefringent reflective polarizer have thicknesses that overlap by at least 80%. In some cases, the protective boundary layer may be the same material as at least one of the alternating layers of the multilayer optical film. In other cases, the protective boundary layer may be a different material, selected for its physical or rheological properties. The protective boundary layers may be on one side or on both sides of an optical packet. In the case of a single-packet multilayer optical film, the protective boundary layer may be on one or both external surfaces of the multilayer optical film.

Skin layers are sometimes added which occurs after the feedblock but before the melt exits the film die. The multilayer melt is then cast through a film die onto a chill roll in the conventional manner for polyester films, upon which it is quenched. The cast web is then stretched by at least one of a variety of possible processes to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.). The films, having birefringence, may be referred to as multilayer birefringent reflective polarizers.

Multilayer birefringent reflective polarizer 110 may have any suitable reflection characteristics. For example, multilayer birefringent reflective polarizer 110 may be a reflective polarizer preferentially reflecting light of one polarization while preferentially transmitting light of a second orthogonal polarization. In some embodiments, the multilayer birefringent reflective polarizer may include or be attached to a quarter-wave retarder to effectively form a circular reflective polarizer. The quarter-wave retarder may, in some embodiments, have a retardance within 50 nm of 137.5 nm for 550 nm light. In some embodiments, the quarter-wave retarder may be or include a birefringent stretched polymer film. In some embodiments, the quarter-wave retarder may be or include a liquid crystal layer. In some embodiments, the quarter-wave retarder may be achromatic over an extended wavelength range; that is, the quarter-wave retarder may provide approximately quarter-wave retardation over that extended wavelength range. In some embodiments, multilayer birefringent reflective polarizer 110 transmits at least 60% of pass state light from 425 nm to 675 nm at normal incidence. In some embodiments, multilayer birefringent reflective polarizer 110 transmits at least 70% of pass state light from 425 nm to 675 nm at normal incidence.

In some embodiments, the multilayer birefringent reflective polarizer includes absorbing elements. In some embodiments, these absorbing elements are absorbing polarizing elements. In some embodiments, these absorbing elements are broadband absorbers, which absorb both orthogonal polarizations of light. In some embodiments, the absorbing polarizing elements may be disposed only within the birefringent layers of the multilayer birefringent reflective polarizer. In some embodiments, the absorbing polarizing elements may be disposed only within some of the birefringent layers of the multilayer birefringent reflective polarizer. Exemplary polarizers including absorbing elements are described in U.S. Patent Publication No. 2016-0306086 (Haag et al.) and U.S. Pat. No. 6,096,375 (Ouderkirk et al.).

The crossweb width of the roll of film is shown in FIG. 1. Across the full crossweb width of the roll of film, the pass axis direction may vary by no more than 1.5 degrees, by no more than 1 degree, by no more than 0.8 degrees, or my no more than 0.5 degrees.

In some embodiments, the full crossweb width of the roll of film is large. In some embodiments, the full crossweb width of the roll of film is greater than 27 inches. In some embodiments, it is greater than 30 inches. In some embodiments, it is greater than 32 inches.

In some embodiments, the multilayer birefringent reflective polarizer has highly developed birefringence. In some embodiments, the difference in index of refraction between two adjacent layers in-plane, along a block direction (orthogonal to the pass axis) may be 0.2 or greater. In some embodiments, the different in index of refraction between two adjacent layers in-plane, along a pass direction may be 0.05 or less.

The multilayer birefringent reflective polarizer may have excellent environmental stability or maintains its performance after extended exposure to hot or humid conditions. In some embodiments, multilayer birefringent reflective polarizer has a contrast ratio of at least 100:1 after the roll of film is exposed to 90% relative humidity at 65° C. for 500 hours.

Figure 2:
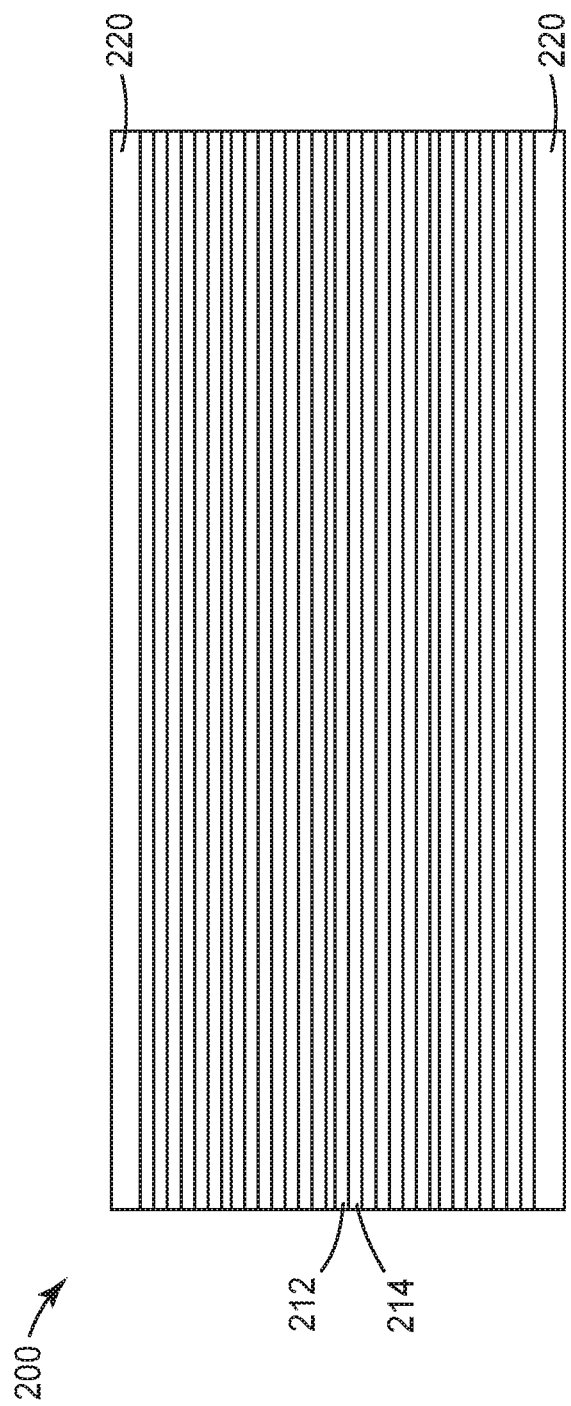
FIG. 2 is a front elevation cross-section of a multilayer birefringent reflective polarizer.

FIG. 2 is a front elevation cross-section of a multilayer birefringent reflective polarizer. Multilayer birefringent reflective polarizer includes alternating layer capable of developing birefringence 212 and isotropic layer 214, and skin layers 220

Skin layers 220 may be any suitable thickness and may be formed from any suitable material. Skin layers 220 may be formed from or include the same materials as one or more of either the layer capable of developing birefringence 212 or isotropic layer 214. Skin layers 220 may be thin; in some embodiments, skin layers may be thinner than 500 nm, thinner than 300 nm, or thinner than 200 nm. In some embodiments, the skin layers should be thicker than 150 nm.

In some embodiments, rolls of film described herein including multilayer birefringent reflective polarizers may be useable in displays or backlights as standalone reflective polarizers. By standalone reflective polarizers, it is meant that the reflective polarizers are suitable for use in displays without lamination to a separate absorbing polarizer. In some embodiments, the roll of film is converted into at least one converted film part, and the converted film part is placed directly adjacent to the liquid crystal panel such that in the assembled display, in an optical path from the liquid crystal panel to the converted film part, there are no absorbing polarizing elements between the liquid crystal panel and the converted film part. In some embodiments, some of the birefringent layers of the multilayer birefringent reflective polarizer of the roll of the film may include polarizing dyes.

Examples

Multilayer films are typically formed in roll-to-roll processes wherein the cross-web dimension is commonly labelled transverse direction (TD) and the dimension along the length of the roll is called machine direction (MD). Furthermore, the films are carefully stretched in the forming process in machine direction and transverse direction in carefully controlled temperature zones to affect the birefringent layers in what is commonly referred to as a tentering process. Furthermore, said tentering processes that may provide either linear transverse stretch or parabolic stretch of the packets as they are formed; allowance for controlled shrinkage during the cool down zone may also require a controlled inward linear retraction commonly referred to as "toe-in". Patent references describing common multilayer optical film processes are interspersed in the following examples as are the process deviations which enable the improved pass axis control for wide web/film products.

The examples that follow depict improvements to the pass axis control across large span web handling equipment. These improvements come from non-conventional process condition modifications. The primary metric for improvements to pass axis control is reported for each example (and comparative example) as a range of pass axis angle as measured from 25 locations across the web in the transverse direction.

Pass Axis Control Definition/Test Method

Pass axis orientation for 25 locations equidistant across the useful web width were collected using a rotary analyzer having ability to report angle to 0.01 degree resolution. Of course, an idealized case would have no variation in pass axis orientation between these 25 data points. We define Pass Axis Control as the peak-to-peak spread in range of measured pass axis orientations reported in degrees.

Absorbing Material within Multilayer Optical Film Examples

These examples incorporate a polarizing dye together with multilayer film packet(s). In the comparative examples (CE-1, CE-2, CE-3) the dye is incorporated in a layer between two reflective polarizers as described in U.S. Pat. No. 7,826,009. In Examples 1-3, the dye is in the birefringent layers of one of the reflective packets as described in U.S. Pre-Grant Patent Publication No. 2016-0306086. Process conditions and pass axis control results are shown in Tables 1 and 2.

For Comparative Examples 1, 2, and 3 the dye layer was in-between the optical packets and is referred to as the "dye layer". For Examples 1, 2, and 3, the absorbing dye is in the birefringent layer of one of the packets referred to as the "dye packet". For these examples PEN is polyethylene naphthalate, PETg is a co-polyester supplied by Eastman Chemicals (Knoxville, Tenn.), while PETg-i5 is a polyester based ionomer and is described in U.S. Pre-Grant Patent Publication 2007-0298271 as "poly-ester O". As noted, the weight fraction of Petg-i5 used as the isotropic layer in all these examples is 2 weight % with the remaining 98 weight % being PETg.

The tenter heat zones for multilayer optical film line are controlled for sequential positions, down web, of the extruder/tenter apparatus. These zones are listed as Pre-heat Temp, Stretch Temp, Heat Set Temp and Cooling Temp with process settings tabled along with. We discovered that for hotter heat-set temperatures (300 F versus 285 F) and reduced toe-in in the heat-set zone of the tenter (0.3% versus 2.4% width reduction) the contrast ratio of the reflective polarizer was maintained and the pass axis range was markedly improved. The rate of change of tension in the machine direction while the film is maintained at a temperature near the stretch temperature and subsequently cooled is believed to be a key parameter when optimizing pass axis range.

The data in table 1 show comparison for the pass axis control (i.e. total range of measured pass axis across the web) for comparative examples (CE-1, CE-2, CE-3) to fall in the 2.13 to 2.79 degree range while the pass axis control for Examples 1-3 falls in the range of 0.85-1.29 degrees. Also shown in Table 1 are the measured values for polarization contrast ratio defined as the average pass state transmission at normal incidence (400-700 nm) divided by the average block state transmission at normal incidence (400-700 nm).

We have demonstrated even further improvements in pass axis control may be obtained by stretching material twice as wide as required and winding the roll from the center of the tenter output while the edges are wound for products with wider pass axis specifications (examples 2 and 3 are center section rolls from available film with twice the width).

TABLE 1

Properties and process conditions for absorbing material within multilayer optical film

| | Pass Axis Range (deg) | block-state Transmission (400-700 nm) | pass-state Transmission (400-700 nm) | Contrast Ratio | Thickness (mils) | Number of micro-layers per packet | Number of optical packets | Pre-heat Temp (F.) | Stretch Temp (F.) | Heat set temp (F.) | Cooling temp (F.) |
|---|---|---|---|---|---|---|---|---|---|---|---|
| Comp Exp 1 | 2.13 | 0.030 | 55.3 | 1843 | 2.85 | 275 | 2 | 300 | 290 | 285 | 120 |
| Comp Exp 2 | 2.79 | 0.030 | 54.7 | 1823 | 2.96 | 275 | 2 | 300 | 290 | 285 | 120 |
| Comp Exp 3 | 2.13 | 0.030 | 53.7 | 1790 | 3.14 | 275 | 2 | 300 | 290 | 285 | 120 |
| Exp 1 | 1.29 | 0.012 | 51.5 | 4292 | 2.37 | 275 | 2 | 304 | 288 | 300 | 120 |
| Exp 2 | 0.85 | 0.060 | 52.9 | 882 | 2.58 | 275 | 2 | 300 | 285 | 300 | 120 |
| Exp 3 | 0.96 | 0.026 | 52.6 | 2023 | 2.56 | 275 | 2 | 300 | 285 | 300 | 120 |

TABLE 2

Process conditions for absorbing material within multilayer optical film

| | Line Speed (fpm) | Birefringent polymer | Birefringent polymer rate (pounds per hour) | Isotropic polymer | Isotropic polymer rate (pounds per hour) | Dye Layer Between Packets | Dye Layer Rate (pph) (between optical packets) | % Toe-in in heat-set and cooling zones | Transverse direction stretch ratio |
|---|---|---|---|---|---|---|---|---|---|
| Comp Exp 1 | 83.8 | PEN | 335 | PETg + PETg-i5 98/2 | 435 | PEN + Dye | 167 | 2.4% | 5.7 |
| Comp Exp 2 | 83.8 | PEN | 334 | PETg + PETg-i5 98/2 | 432 | PEN + Dye | 166 | 2.4% | 5.7 |
| Comp Exp 3 | 83.9 | PEN | 319 | PETg + PETg-i5 98/2 | 430 | PEN + Dye | 154 | 2.4% | 5.7 |

| | | non-dye packet | | | dye packet | | % Toe-in | |
|---|---|---|---|---|---|---|---|---|
| Exp | Line Speed (fpm) | Birefringent layer material | Birefringent polymer rate (pounds per hour) | Isotropic micro-layers In both packets | Birefringent layer material | Birefringent layer material rate (pounds per hour) | in heat-set and cooling zones | Transverse direction stretch ratio |
| Exp 1 | 73.2 | PEN | 243 | PETg + PETg-i5 98/2 | 586 | PEN + Dye | 216 | 0.3% | 6.20 |
| Exp 2 | 67.6 | PEN | 234 | PETg + PETg-i5 98/2 | 529 | PEN + Dye | 175 | 0.3% | 6.2 |
| Exp 3 | 67.6 | PEN | 230 | PETg + PETg-i5 98/2 | 521 | PEN + Dye | 183 | 0.3% | 6.2 |

Reflective Polarizer Using True Uniaxial Stretch (Parabolic Tenter)

Multilayer reflective polarizers with no absorbing dyes were produced utilizing a true uniaxial stretch using a parabolic tenter that is described in U.S. Pat. No. 6,939,499. The process parameters are described along with the resulting measurements of pass axis control in Tables 3 and 4.

For these examples, the number of optical layers was 610, equally divided between two optical packets (305 microlayers per packet). The data describing process conditions for these examples is found in Table 3a and 3b. The distance between the takeaway belts and the parabolic rails is referred to as the "collision parameter" and is tabulated in Table 3b.

The parabolic tenter is divided into five heat zones in the machine direction with the final zone, zone 5, being the cooling zone after the stretching is complete. The take away ratio is defined as the ratio of the speed of the film exiting the stretching process to the speed of the film entering the stretching process. This is synonymous with the draw ratio in the machine direction. For a take away ratio of 0.5 the film has been deformed so that it is half the length in the machine direction after being oriented.

PC/CoPET refers to a polycarbonate/co-polyester blend, which in this case is Xylex EXXX0281 available from Sabic USA (Houston, Tex.). PETg is a copolyester available from Eastman Chemicals (Knoxville, Tenn.). 90/10 CoPEN is a random copolyester that is 90 mol % polyethylene naphthalate and 10 mol % polyethylene terephthalate produced by 3M Company (Saint Paul, Minn.).

We have discovered that improved cross pass axis uniformity is achieved with the higher collision parameters. Pass axis control for examples 4-6 falls within the range of 0.8 to 0.9 degrees whereas pass axis control for comparative examples (CE-4, CE-5 and CE-6) range within 1.6 to 2.7 degrees.

Figure 4:
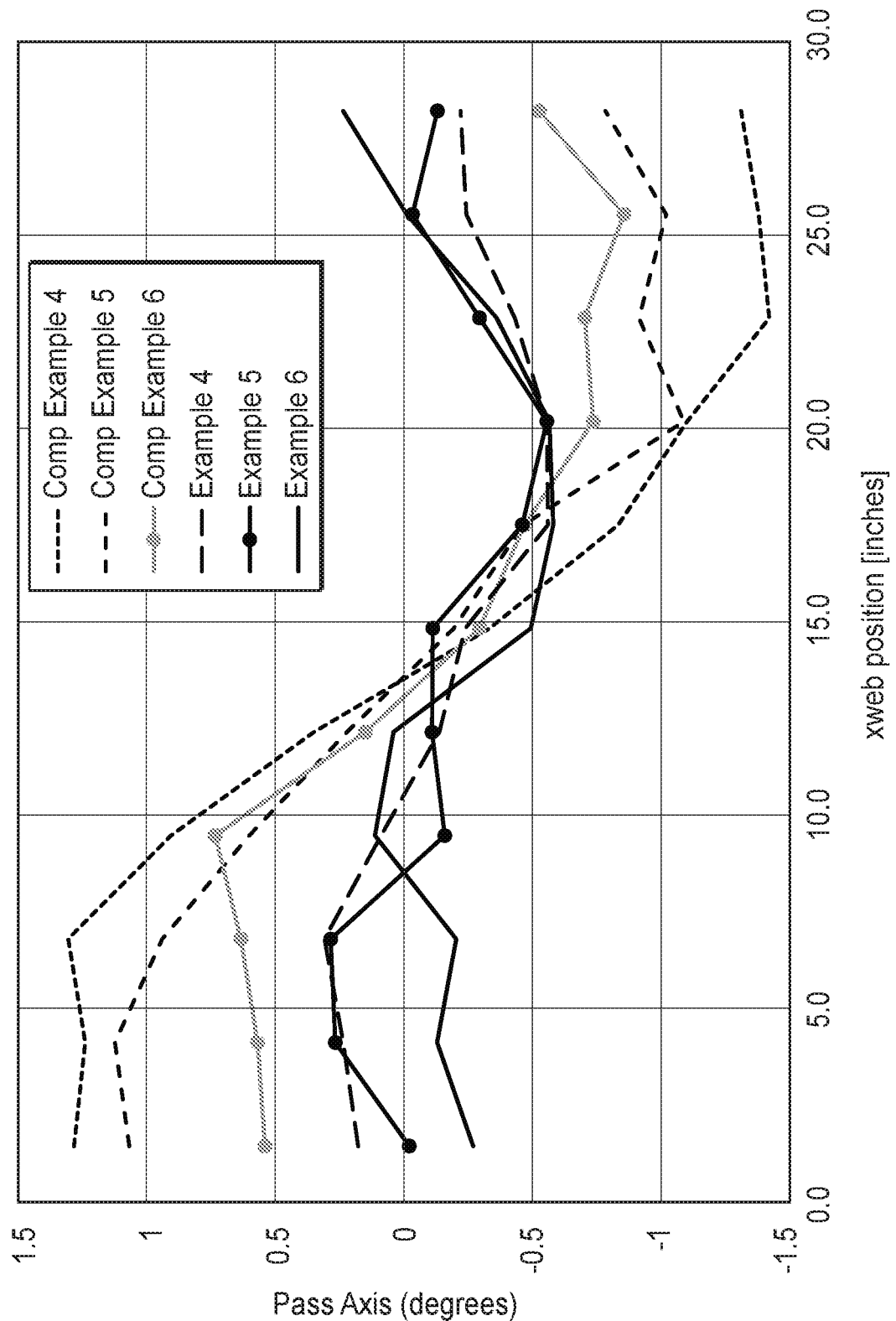
FIG. 4 is a graph of pass axis variation along the crossweb direction for the examples and comparative examples.

FIG. 4 shows the pass axis data measured every 2.2 inches in the transverse (crossweb) direction for examples 4, 5, 6, CE-4, CE-5, and CE-6. In each case, the contrast ratio of these films was greater than 3000 due to the large number of layers; large refractive index difference afforded by the orientation characteristics of the parabolic tenter; and the carefully controlled layer thickness profiles for each packet. For Example 6, the contrast ratio was measured to be 4502.

TABLE 3

True uniaxial oriented reflective polarizer process data

| | | Isotropic Layers | | Birefrigent Layers | | | | | |
|---|---|---|---|---|---|---|---|---|---|
| | | Both packets | | Packet 1 90/10 | | | Packet 2 90/10 | | |
| Example | Polymer | PC/CoPET rate | PETg rate | Polymer | CoPEN (lb/hr) | PEN (lb/hr) | Polymer | CoPEN (lb/hr) | PEN (lb/hr) |
| Comparative Example 4 | Xylex/PETg | 275 | 69 | 90/10 CoPEN & PEN | 110 | 40 | 90/10 CoPEN & PEN | 111.5 | 40 |
| Comparative Example 5 | Xylex/PETg | 275 | 69 | 90/10 CoPEN & PEN | 110 | 40 | 90/10 CoPEN & PEN | 111.5 | 40 |
| Comparative Example 6 | Xylex/PETg | 275 | 69 | 90/10 CoPEN & PEN | 110 | 40 | 90/10 CoPEN & PEN | 111.5 | 40 |
| Example 4 | Xylex/PETg | 275 | 69 | 90/10 CoPEN & PEN | 110 | 40 | 90/10 CoPEN & PEN | 111.5 | 40 |
| Example 5 | Xylex/PETg | 275 | 69 | 90/10 CoPEN & PEN | 110 | 40 | 90/10 CoPEN & PEN | 111.5 | 40 |
| Example 6 | Xylex/PETg | 275 | 69 | 90/10 CoPEN & PEN | 110 | 40 | 90/10 CoPEN & PEN | 111.5 | 40 |

TABLE 4

True uniaxial oriented reflective polarizer process data

| | | | Tenter | | | | | |
|---|---|---|---|---|---|---|---|---|
| | | | Tenter Zone Temps (F.) | | | | | |
| Example | Cast Wheel Speed (ft/min) | Inlet Web Width (in) | Zone 1 to Zone 4 (pre-heat and stretch) | Z5 (cooling zone) | Take Away Ratio | Transvere Direction Stretch Ratio | Collision Parameter (in) | Optical Axis range (deg) over 28.2" | Thickness (mils) |
| Comparative Example 4 | 105 | 18 | 290 | 175 | 0.50 | 5.44 | 0.5 | 2.7 | 2.463 |
| Comparative Example 5 | 105 | 18 | 290 | 175 | 0.50 | 5.65 | 1 | 2.2 | 2.44 |
| Comparative Example 6 | 105 | 18 | 290 | 175 | 0.50 | 5.83 | 2 | 1.6 | 2.34 |
| Example 4 | 105 | 18 | 290 | 175 | 0.50 | 6.05 | 3 | 0.9 | 2.247 |
| Example 5 | 105 | 18 | 290 | 175 | 0.50 | 6.25 | 4 | 0.8 | 2.171 |
| Example 6 | 105 | 18 | 290 | 175 | 0.50 | 6.50 | 5 | 0.8 | 2.108 |

The following are exemplary embodiments according to the present disclosure:

Item 1. A roll of film, comprising:
a multilayer birefringent reflective polarizer having a pass axis that varies along a crossweb direction;
wherein the multilayer birefringent reflective polarizer includes alternating layers of a birefringent layer and an isotropic layer;
wherein the birefringent layer of the multilayer birefringent reflective polarizer includes polyethylene naphthalate or a copolymer including polyethylene naphthalate and polyethylene terephthalate monomers;
wherein the pass axis of the multilayer birefringent reflective polarizer varies by no more than about 1 degree across a full crossweb width of the roll of film;
wherein the full crossweb width is greater than 27 inches; and
wherein the multilayer birefringent reflective polarizer has a contrast ratio of at least 200:1 after the roll of film is exposed to 90% relative humidity at 65° C. for 500 hours.

Item 2. The roll of film of item 1, wherein the multilayer birefringent reflective polarizer includes at least two optical packets, each optical packet having a linear layer profile.

Item 3. The roll of film of item 2, wherein the at least two optical packets have thicknesses that overlap by at least 80%.

Item 4. The roll of film of item 1, wherein some of the birefringent layers of the multilayer birefringent reflective polarizer include polarizing dyes.

Item 5. The roll of film of item 1, wherein each of the birefringent layers of the multilayer birefringent reflective polarizer include polarizing dyes.

Item 6. A method of assembling a display, comprising:
providing a liquid crystal panel;
providing the roll of film of claim 1;
converting the roll of film into at least one converted film part;
placing one of the at least one converted film part directly adjacent to the liquid crystal panel such that in the assembled display, in an optical path from the liquid crystal panel to the one of the at least one converted film part, there are no absorbing polarizing elements between the liquid crystal panel and the one of the at least one converted film part.

Item 7. The method of item 6, wherein placing one of the at least one converted film part directly adjacent to the liquid crystal panel includes laminating the one of the at least one converted film part to the liquid crystal panel.

Item 8. A method of processing a polymeric web comprising:
providing a polymeric multilayer web including alternating layers of a layer capable of developing birefringence including polyethylene naphthalate or a copolymer including polyethylene naphthalate and polyethylene terephthalate monomers, and an isotropic layer;
heating the polymeric multilayer web beyond the glass transition temperature of the isotropic layer;
tentering the polymeric multilayer web to form a multilayer reflective polarizer such that the layer capable of developing birefringence develops birefringence; and
after tentering, controlling the instantaneous change in machine direction tension of the multilayer reflective polarizer such that the pass axis of the multilayer reflective polarizer varies by no more than about 1.5 degrees across a full crossweb width of the multilayer reflective polarizer;
wherein the multilayer reflective polarizer is environmentally stable such that the multilayer reflective polarizer has a contrast ratio of at least 200:1 after the multilayer reflective polarizer is exposed to 90% relative humidity at 65° C. for 500 hours.

Item 9. The method of item 5, wherein tentering includes tentering on a linear tenter and controlling the instantaneous change in machine direction tension of the multilayer reflective polarizer includes limiting crossweb relaxation after tentering.

Item 10. The method of item 6, wherein limiting crossweb relaxation after tentering means the crossweb width is reduced by no more than 1%—not including edge trimming—before quenching.

Item 11. The method of item 6, wherein limiting crossweb relaxation after tentering means the crossweb width is reduced by no more than 0.5%—not including edge trimming—before quenching.

Item 12. The method of item 5, wherein tentering includes tentering on a parabolic tenter and controlling the instantaneous change in machine direction tension of the multilayer reflective polarizer includes providing a gap of at least 3 inches in a machine direction between an end of rails of the parabolic tenter and a beginning of rails of an isolated takeaway mechanism.

Item 13. The method of item 9, wherein the gap is at least 4 inches.

Item 14. The method of item 9, wherein the gap is at least 5 inches.

Item 15. A method of processing a polymeric web comprising:
providing a polymeric multilayer web including alternating layers of a layer capable of developing birefringence including polyethylene naphthalate or a copolymer including polyethylene naphthalate and polyethylene terephthalate monomers, and an isotropic layer;
heating the polymeric multilayer web beyond the glass transition temperature of the isotropic layer;
forming a multilayer reflective polarizer by tentering the polymeric multilayer web with a total transverse direction draw ratio of about 6.5 or greater such that the layer capable of developing birefringence develops birefringence;
wherein the multilayer reflective polarizer is environmentally stable such that the multilayer reflective polarizer has a contrast ratio of at least 200:1 after the multilayer reflective polarizer is exposed to 90% relative humidity at 65° C. for 500 hours.

What is claimed is:
1. A roll of film, comprising:
a multilayer birefringent reflective polarizer having a pass axis that varies along a crossweb direction;
wherein the multilayer birefringent reflective polarizer includes two or more optical packets, each optical packet comprising a plurality of alternating layers of a birefringent layer and an isotropic layer, wherein the alternating layers are alternating micro-layers;
wherein the birefringent layer of the multilayer birefringent reflective polarizer includes polyethylene naphthalate or a copolymer including polyethylene naphthalate and polyethylene terephthalate monomers;

wherein the pass axis of the multilayer birefringent reflective polarizer varies by no more than about 1.5 degrees across a full crossweb width of the roll of film;

wherein the full crossweb width is greater than 27 inches; and wherein the multilayer birefringent reflective polarizer is environmentally stable such that it has a contrast ratio of at least 200:1 after the roll of film is exposed to 90% relative humidity at 65° C. for 500 hours.

2. The roll of film of claim 1, wherein each optical packet has a linear layer profile.

3. The roll of film of claim 2, wherein the at least two optical packets have thicknesses that overlap by at least 80%.

4. The roll of film of claim 1, wherein some of the birefringent layers of the multilayer birefringent reflective polarizer include polarizing dyes.

5. The roll of film of claim 1, wherein each of the birefringent layers of the multilayer birefringent reflective polarizer include polarizing dyes.

6. A method of assembling a display, comprising:
providing a liquid crystal panel;
providing the roll of film of claim 1;
converting the roll of film into at least one converted film part;
placing one of the at least one converted film part directly adjacent to the liquid crystal panel such that in the assembled display, in an optical path from the liquid crystal panel to the one of the at least one converted film part, there are no absorbing polarizing elements between the liquid crystal panel and the one of the at least one converted film part.

7. The method of claim 6, wherein placing one of the at least one converted film part directly adjacent to the liquid crystal panel includes laminating the one of the at least one converted film part to the liquid crystal panel.

8. A method of forming a roll of film comprising:
providing a polymeric multilayer web including alternating layers of a layer capable of developing birefringence including polyethylene naphthalate or a copolymer including polyethylene naphthalate and polyethylene terephthalate monomers, and an isotropic layer;
heating the polymeric multilayer web beyond the glass transition temperature of the isotropic layer;
tentering the polymeric multilayer web to form a multilayer birefringent reflective polarizer such that the layer capable of developing birefringence develops birefringence and becomes a birefringent layer;
after tentering, controlling the instantaneous change in machine direction tension of the multilayer birefringent reflective polarizer such that the pass axis of the multilayer birefringent reflective polarizer varies by no more than about 1.5 degrees across a full crossweb width of the multilayer birefringent reflective polarizer, and the full crossweb width is greater than 27 inches; and
winding the multilayer birefringent reflective polarizer into the roll of film;
wherein the multilayer birefringent reflective polarizer includes at least two optical packets, each optical packet including a plurality of alternating layers of a birefringent layer and an isotropic layer, the alternating layers being alternating micro-layers,
wherein the multilayer birefringent reflective polarizer is environmentally stable such that it has a contrast ratio of at least 200:1 after the roll of film is exposed to 90% relative humidity at 65° C. for 500 hours.

9. The method of claim 8, wherein tentering includes tentering on a linear tenter, and controlling the instantaneous change in machine direction tension of the multilayer birefringent reflective polarizer includes limiting crossweb relaxation after tentering.

10. The method of claim 9, wherein limiting crossweb relaxation after tentering means the crossweb width is reduced by no more than 1%, not including edge trimming, before quenching.

11. The method of claim 9, wherein limiting crossweb relaxation after tentering means the crossweb width is reduced by no more than 0.5%, not including edge trimming, before quenching.

12. The method of claim 8, wherein tentering includes tentering on a parabolic tenter, and controlling the instantaneous change in machine direction tension of the multilayer birefringent reflective polarizer includes providing a gap of at least 3 inches in a machine direction between an end of rails of the parabolic tenter and a beginning of rails of an isolated takeaway mechanism.

13. The method of claim 12, wherein the gap is at least 4 inches.

14. The method of claim 12, wherein the gap is at least 5 inches.

* * * * *